(12) United States Patent
Otani et al.

(10) Patent No.: US 9,837,950 B2
(45) Date of Patent: Dec. 5, 2017

(54) VEHICLE CONTROL DEVICE AND RAILROAD VEHICLE

(71) Applicant: KABUSHIKI KAISHA TOSHIBA, Minato-ku, Tokyo (JP)

(72) Inventors: Hiroaki Otani, Fuchu Tokyo (JP); Masanao Itoh, Kunitachi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 4 days.

(21) Appl. No.: 15/005,402

(22) Filed: Jan. 25, 2016

(65) Prior Publication Data

US 2016/0142004 A1    May 19, 2016

Related U.S. Application Data

(63) Continuation of application No. PCT/JP2014/070512, filed on Aug. 4, 2014.

(30) Foreign Application Priority Data

Aug. 7, 2013 (JP) .................................. 2013-164539

(51) Int. Cl.
*H02P 29/02* (2016.01)
*B60L 9/22* (2006.01)
(Continued)

(52) U.S. Cl.
CPC .......... *H02P 29/0243* (2016.02); *B60L 3/003* (2013.01); *B60L 9/22* (2013.01);
(Continued)

(58) Field of Classification Search
CPC ..... H02H 3/34; H02P 29/0243; H02P 27/085; B60L 3/003; B60L 9/22
(Continued)

(56) References Cited

U.S. PATENT DOCUMENTS 4,724,503 A * 2/1988 Libert .................... H02H 7/097
                                                    318/798
7,813,626 B2 * 10/2010 Suzuki ................... B62D 5/046
                                                    318/400.02
(Continued)

FOREIGN PATENT DOCUMENTS

CN          101330269 A       12/2008
CN          101388632 A        3/2009
(Continued)

OTHER PUBLICATIONS

International Search Report (ISR) dated Oct. 21, 2014 issued in International Application No. PCT/JP2014/070512.
(Continued)

*Primary Examiner* — Bentsu Ro
(74) *Attorney, Agent, or Firm* — Holtz, Holtz & Volek PC

(57) ABSTRACT

A vehicle control device according to one embodiment includes an inverter converting a DC power to a three-phase AC power and supplying the three-phase AC power to a motor driving a vehicle. A detector detects a current value between the inverter and the motor. A controller PWM-controls the inverter based on a current value detected by the detector, a speed command signal, and a rotor frequency of the motor. The controller determines occurrence of a malfunction when a PWM modulation rate is equal to or higher than a predetermined value and the rotor frequency is equal to or lower than a predetermined value.

7 Claims, 4 Drawing Sheets

(51) Int. Cl.
*H02P 29/024* (2016.01)
*H02P 27/08* (2006.01)
*B60L 3/00* (2006.01)

(52) U.S. Cl.
CPC ......... *H02P 27/085* (2013.01); *B60L 2200/26* (2013.01); *B60L 2240/12* (2013.01); *B60L 2240/421* (2013.01); *B60L 2240/423* (2013.01); *B60L 2240/429* (2013.01); *B60L 2250/10* (2013.01); *B60L 2250/16* (2013.01); *Y02T 10/642* (2013.01)

(58) Field of Classification Search
USPC .......................................... 318/430–434, 139
See application file for complete search history.

(56) References Cited

U.S. PATENT DOCUMENTS

| | | | |
|---|---|---|---|
| 7,948,205 | B2 | 5/2011 | Gunji |
| 7,990,094 | B2 | 8/2011 | Tamaizu |
| 8,013,564 | B2 | 9/2011 | Gunji |
| 8,040,081 | B2 * | 10/2011 | Shimana ................ B60K 6/26 180/65.285 |
| 8,497,651 | B2 | 7/2013 | Tang et al. |
| 2014/0054103 | A1 | 2/2014 | Kezobo et al. |

FOREIGN PATENT DOCUMENTS

| | | |
|---|---|---|
| CN | 102004224 A | 4/2011 |
| JP | 02246701 A | 10/1990 |
| JP | 06245301 A | 9/1994 |
| JP | 2980698 B2 | 11/1999 |
| JP | 2001258288 A | 9/2001 |
| JP | 4086178 B2 | 5/2008 |
| JP | 2008206276 A | 9/2008 |
| JP | 2011147317 A | 7/2011 |
| JP | 2012065416 A | 3/2012 |
| JP | 2013031356 A | 2/2013 |

OTHER PUBLICATIONS

International Preliminary Report on Patentability (IPRP) including Written Opinion (in English) dated Feb. 18, 2016, issued in parent International Application No. PCT/JP2014/070512.

* cited by examiner

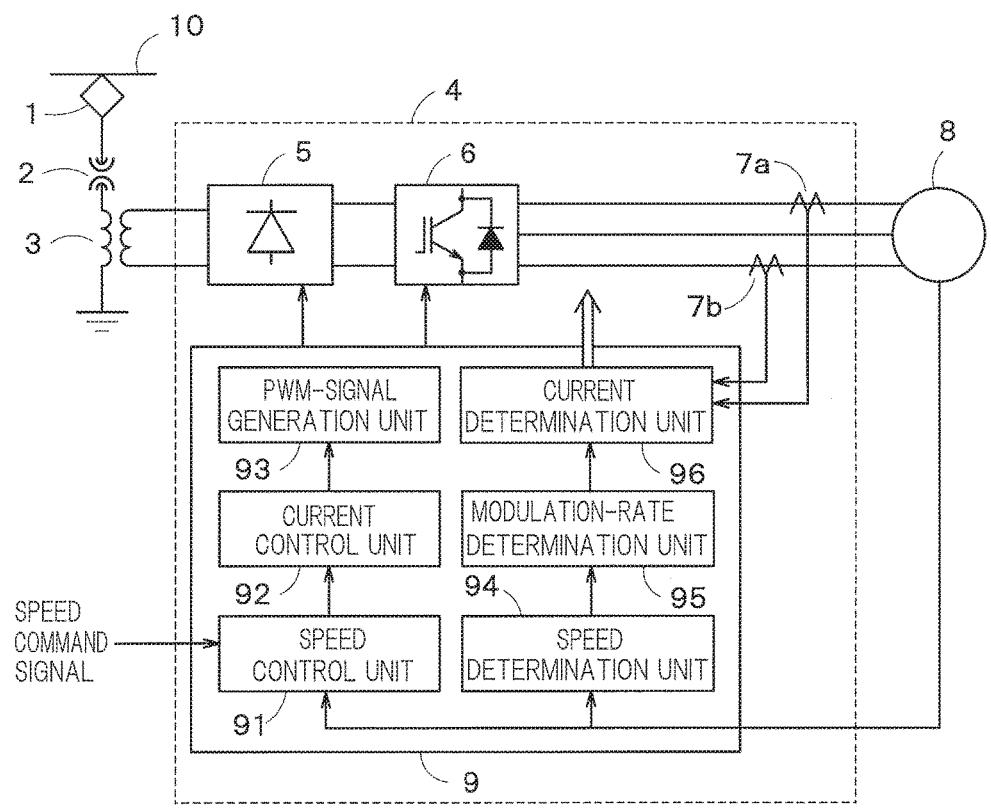
F I G. 1
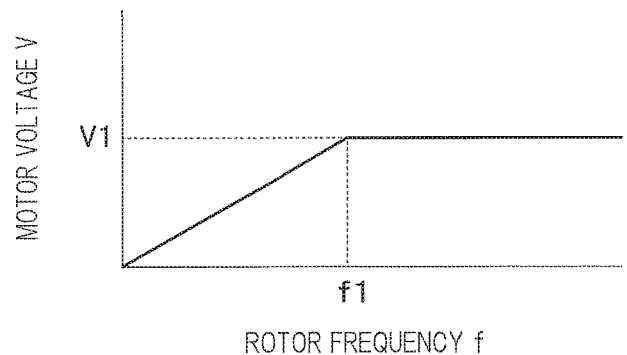
F I G. 2

VEHICLE CONTROL DEVICE AND RAILROAD VEHICLE

CROSS REFERENCE TO RELATED APPLICATIONS

This application is based upon and claims the benefit of priority from the prior Japanese Patent Application No 2013-164539, filed on Aug. 7, 2013, the entire contents of which are incorporated herein by reference.

FIELD

The embodiments of the present invention relate to a vehicle control device and a railroad vehicle.

BACKGROUND

A railroad vehicle has a motor that drives the vehicle and a vehicle control device that receives power from an overhead line and converts the received power to a required voltage or current to supply the power to the motor. Voltage or current conversion in the vehicle control device is mainly performed by an inverter device. For example, a three-phase alternating current (AC) output from the inverter device is supplied to the motor.

When a malfunction such as breaking of a command line for driving the inverter device or an open phase of the three-phase AC output from the inverter device occurs, the motor cannot be driven normally. Accordingly, prompt detection of a malfunction such as the open phase particularly in a low speed area of the vehicle is demanded.

BRIEF DESCRIPTION OF THE DRAWINGS

FIG. 1 shows a schematic configuration of a vehicle control device according to the present embodiment;

FIG. 2 is a graph showing a relation between the rotor frequency f and the motor voltage V;

DETAILED DESCRIPTION

Figure 3:
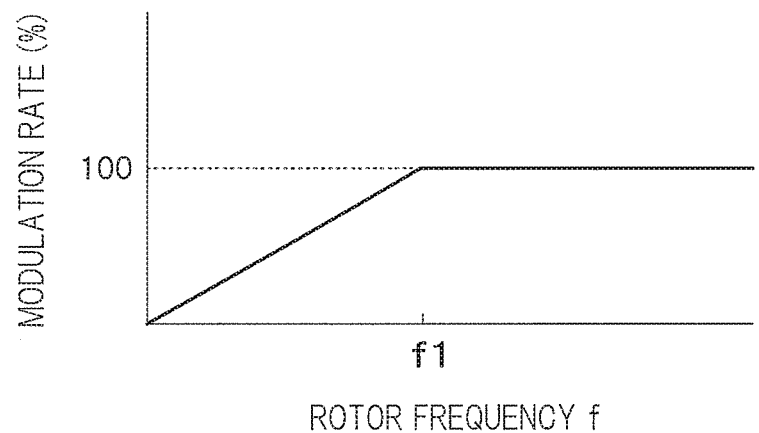
FIG. 3 is a graph showing a relation between the rotor frequency f and the modulation rate.

Embodiments will now be explained with reference to the accompanying drawings.

A vehicle control device according to one embodiment includes an inverter converting a DC power to a three-phase AC power and supplying the three-phase AC power to a motor driving a vehicle. A detector detects a current value between the inverter and the motor. A controller PWM-controls the inverter based on a current value detected by the detector, a speed command signal, and a rotor frequency of the motor. The controller determines occurrence of a malfunction when a PWM modulation rate is equal to or higher than a predetermined value and the rotor frequency is equal to or lower than a predetermined value.

FIG. 1 shows a schematic configuration of a vehicle control device according to the present embodiment. A vehicle control device 4 includes a converter 5, an inverter 6, and a controller (control unit) 9. The controller 9 can be provided outside of the vehicle control device 4. As shown in FIG. 1, AC power collected from an AC overhead line 10 via pantographs 1 is input through a VCB (Vacuum Circuit Breaker) 2 and a main transformer 3 to the converter 5.

The converter 5 converts the input AC power into direct-current (DC) power and outputs the direct-current (DC) power. The converter 5 is, for example, a PWM (Pulse Width Modulation) converter and incorporates a semiconductor switching element such as an IGBT (Insulated Gate Bipolar Transistor), a diode or a clamp diode connected in parallel to the semiconductor switching element, and the like. Turning on/off of the semiconductor switching element is controlled by the controller 9.

The inverter 6 converts a DC power output from the converter 5 into an AC power and generates a three-phase AC with a U phase, a V phase, and a W phase shifted by 120° from each other. The inverter 6 is a VVVF (Variable Voltage Variable Frequency) inverter incorporating a semiconductor switching element such as an IGBT, and a diode or a clamp diode connected in parallel to the semiconductor switching element, and the like. The semiconductor switching element of the inverter 6 operates to be on/off based on a gate signal output from the controller 9. That is, the controller 9 controls the semiconductor switching element of the inverter 6 so that the DC power output from the converter 5 is PWM-controlled.

The inverter 6 supplies the generated three-phase AC to a motor (a three-phase induction motor) 8 and executes a drive control of a railroad vehicle. The motor 8 drives the railroad vehicle with a rotor thereof (not shown) connected to an axle of driving wheels via a gear or the like or with the rotor directly connected to the axle of the driving wheels. An angle detection unit (not shown) such as a rotary encoder that detects an angle (position) of the rotor is also provided and the controller 9 obtains a detection result from the angle detection unit. The controller 9 can calculate a rotor frequency (a motor speed) based on the detection result of the angle detection unit.

As shown in FIG. 1, current detectors 7a and 7b that detect phase current values of two phases in the three-phase current output from the inverter 6, respectively, are provided. The controller 9 obtains the current values detected by the current detectors 7a and 7b. In the three-phase AC, a current value of one phase is the sum of the current values of the remaining two phases with the opposite sign. Accordingly, a phase current of a phase for which the current detectors 7a and 7b are not provided can be obtained from the current values detected by the current detectors 7a and 7b.

The controller 9 has a speed control unit 91, a current control unit 92 and a PWM-signal generation unit 93. The speed control unit 91 compares the present motor speed with a speed command signal and generates an acceleration/deceleration command. The current control unit 92 generates a current command value using the command from the speed control unit 91 and the present motor current calculated from the current values detected by the current detectors 7a and 7b. The PWM-signal generation unit 93 generates a PWM signal to flow a motor current corresponding to the current command value and transmits the PWM signal to the inverter 6. The semiconductor switching element of the inverter 6 operates to be on/off based on the PWM signal. The PWM-signal generation unit 93 also generates a PWM signal to turn the semiconductor switching element of the converter 5 on/off and transmits the PWM signal to the converter 5.

As shown in FIG. 1, the controller 9 also has a speed determination unit 94, a modulation-rate determination unit 95 and a current determination unit 96. The speed determination unit 94 determines whether a vehicle speed is in an area of low speeds equal to or lower than a predetermined value. The modulation-rate determination unit 95 determines whether a PWM modulation rate (a ratio of the pulse width in the PWM) of the inverter 6 is larger than a predetermined value. For example, the speed determination unit 94 determines that a vehicle speed is in the low speed area when a rotor frequency is lower than a predetermined value and determines that a vehicle speed is not in the low speed area when a rotor frequency is equal to or higher than the predetermined value. The PWM modulation rate (hereinafter, also simply "modulation rate") will be explained later.

FIG. 2 is a graph showing a relation between the rotor frequency f and the motor voltage V during a normal period (when no malfunction is occurring). As shown in FIG. 2, under a vector control of a VVVF inverter, the rotor frequency f and the motor voltage V have a proportional relation in a range equal to or lower than a predetermined frequency (a frequency f1 in FIG. 2). When the rotor frequency f is higher than the frequency f1, the control is executed to cause the motor voltage V to be constant at a voltage V1.

FIG. 3 is a graph showing a relation between the rotor frequency f and the modulation rate during the normal period. The modulation rate can be calculated, for example, by the following expression:

Modulation rate (%)=Present motor voltage/Maximum motor voltage where the maximum motor voltage corresponds to the voltage V1 in FIG. 2. The present motor voltage can be calculated based on the current command value.

As shown in FIGS. 2 and 3, when the motor voltage V becomes constant, the modulation rate becomes 100%. Furthermore, as shown in FIG. 3, when the rotor frequency f is low, that is, when the vehicle speed is low, the modulation rate and the rotor frequency f have a proportional relation.

Figure 4:
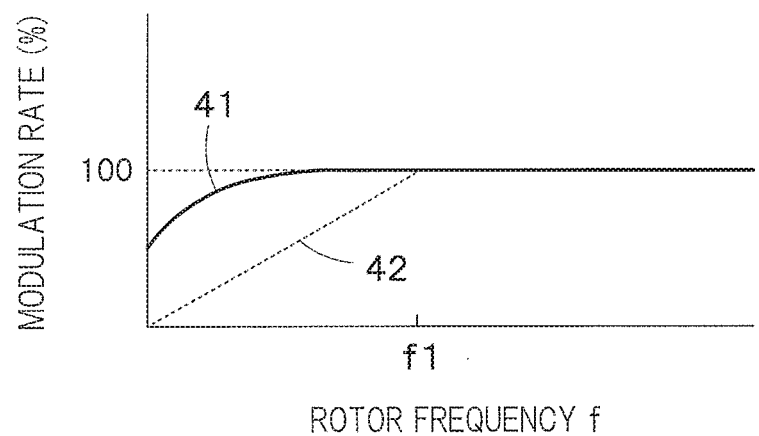
FIG. 4 is a graph showing a relation between the rotor frequency f and the modulation rate when a malfunction occurs.

When a malfunction is occurring in the vehicle control device 4, the rotor frequency f and the modulation rate has a relation shown by a graph 41 in FIG. 4. For comparison, the relation between the rotor frequency f and the modulation rate during the normal period is shown by a broken line 42. When a malfunction is occurring and an actual current corresponding to the current command value is not flowing, a control to increase the modulation rate (the motor voltage) to flow a desired current is executed. Accordingly, at the time of occurrence of a malfunction, the current command value becomes larger in the low speed area (in the area where the rotor frequency f is low) than that in the normal period. That is, the present motor voltage becomes higher and thus the modulation rate becomes higher.

Therefore, the present embodiment utilizes these characteristics and the controller 9 determines occurrence of a malfunction in the vehicle control device 4 and informs of occurrence of the malfunction when the modulation rate exceeds a predetermined threshold in the low speed area. For example, an area in which the speed of a vehicle is equal to or lower than 30% of the maximum speed (during normal travelling) is regarded as the low speed area, and the controller 9 determines occurrence of a malfunction when the modulation rate exceeds 30% in a state where the rotor frequency f does not reach 0.3×f1.

By utilizing the modulation rate in this way, occurrence of a malfunction can be promptly detected in the low speed area.

Furthermore, after determining occurrence of a malfunction, the controller 9 can determine whether the occurring malfunction is an open phase using the current values detected by the current detectors 7a and 7b. The controller 9 determines that the occurring malfunction is an open phase when the current value detected by the current detector 7a, the current value detected by the current detector 7b, or the sum of the current values detected by the current detectors 7a and 7b is smaller than a predetermined threshold.

Figure 5:
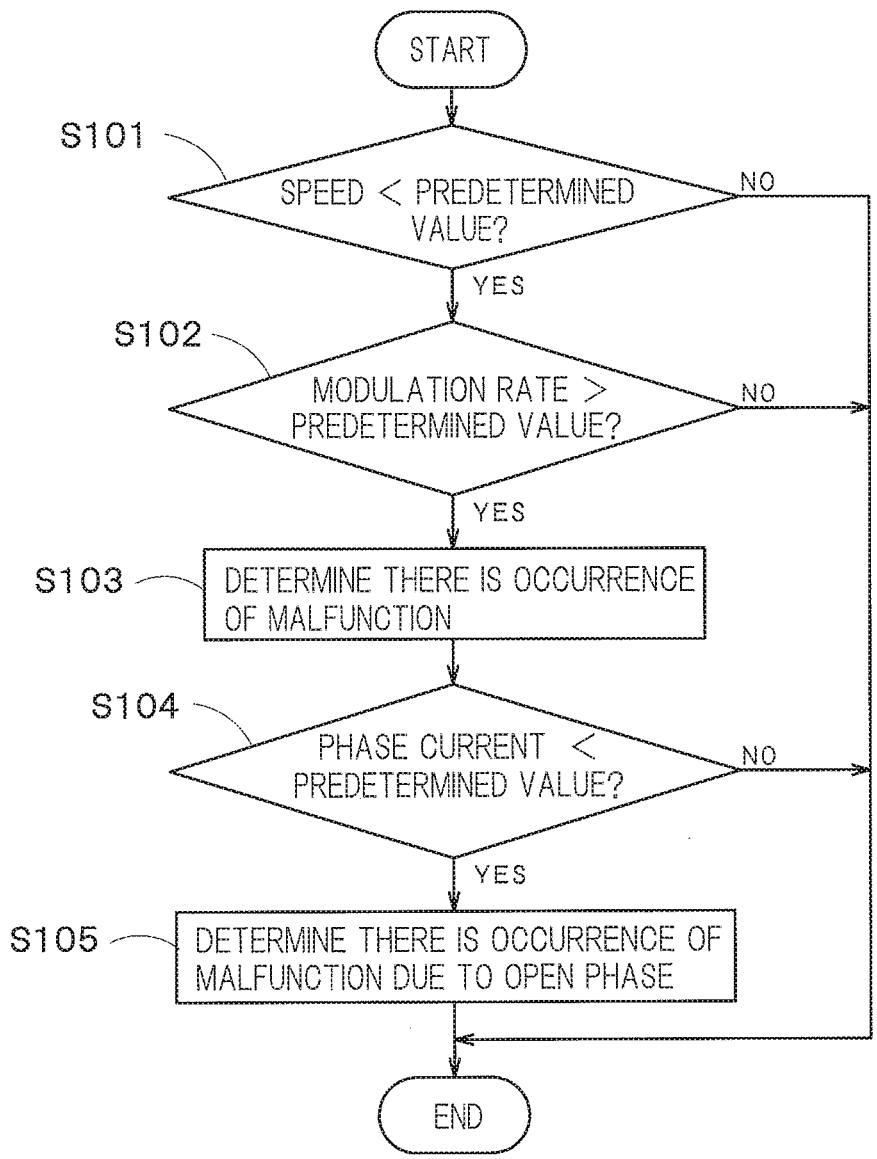
FIG. 5 is a flowchart showing a method of detecting a malfunction according to the present embodiment.

A method of detecting a malfunction and an open phase is explained with reference to a flowchart shown in FIG. 5.

(Step S101) The speed determination unit 94 determines whether a vehicle speed is lower than a predetermined value. When the vehicle speed is lower than the predetermined value, the speed determination unit 94 transmits a determination request signal to the modulation-rate determination unit 95 (that is, processing proceeds to Step S102). The processing ends when the vehicle speed is equal to or higher than the predetermined value. In the present embodiment, this processing is performed to detect occurrence of a malfunction (an open phase) in the low speed area. The vehicle speed can be replaced by the rotor frequency f (the motor speed).

(Step S102) The modulation-rate determination unit 95 to which the determination request signal has been input from the speed determination unit 94 determines whether a PWM modulation rate is larger than a predetermined value. When the PWM modulation rate is larger than the predetermined value, the modulation-rate determination unit 95 determines occurrence of a malfunction and outputs a current-determination request signal to the current determination unit 96 (that is, the processing proceeds to Step S103). The processing ends when the PWM modulation rate is equal to or smaller than the predetermined value. Alternately, the modulation-rate determination unit 95 may determine occurrence of a malfunction when the condition in which the PWM modulation rate is larger than the predetermined value is maintained during a predetermined time period.

(Step S103) Because an actual current corresponding to the current command value is not flowing, it is determined that a malfunction is occurring in the device.

(Step S104) The current determination unit 96 to which the current-determination request signal from the modulation-rate determination unit 95 has been input obtains the current values detected by the current detectors 7a and 7b. When the current value detected by the current detector 7a, the current value detected by the current detector 7b, or the sum of the current values detected by the current detectors 7a and 7b is smaller than a predetermined value previously set in the current determination unit 96, it is determined that the occurring malfunction is an open phase (that is, the processing proceeds to Step S105).

(Step S105) The current determination unit 96 of the controller 9 determines that the occurring malfunction is an open phase. For example, when the detection value of the current detector 7a is smaller than the predetermined value, it is determined that breaking is occurring in a wire on which the current detector 7a is provided. When the detection value of the current detector 7b is smaller than the predetermined value, it is determined that breaking is occurring in a wire on which the current detector 7b is provided. When the sum of the detection values of the current detectors 7a and 7b is smaller than the predetermined value, it is determined that breaking is occurring in a wire on which the current detectors 7a and 7b are not provided. At that time, it is also possible to output a malfunction occurrence signal to outside as required to display the malfunction occurrence on an external display unit.

In this way, by using the modulation rate and the detection results of the current detectors 7a and 7b, occurrence of an open phase can accurately detected in the low speed area of a vehicle.

When the detection value of the current detector 7a, the detection value of the current detector 7b, and the sum of the detection values of the current detectors 7a and 7b are equal to or larger than the predetermined value at Step S104, it is determined that a malfunction other than an open phase (a failure) is occurring.

Figure 6:
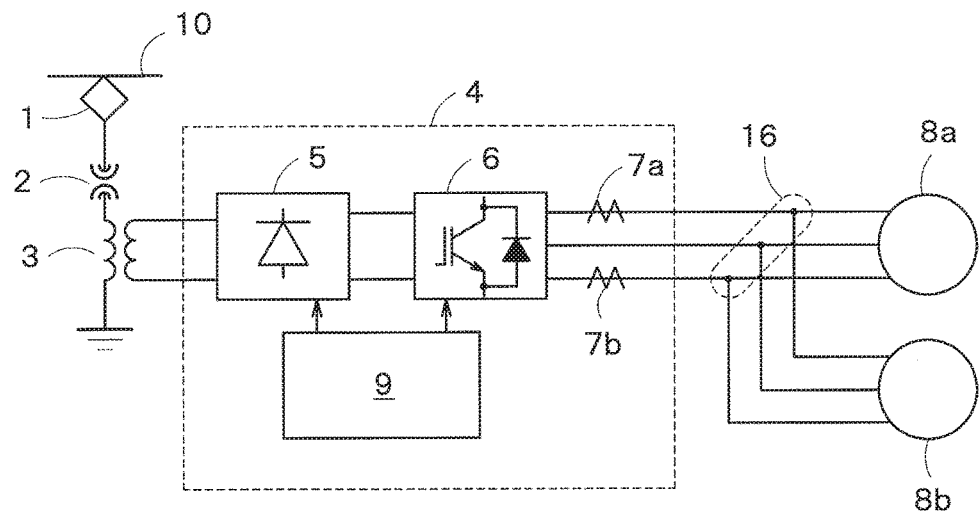
FIG. 6 shows a schematic configuration of a vehicle control device according to a modification of the present embodiment.

As shown in FIG. 6, a configuration including two motors 8a and 8b can be adopted. A wire through which the three-phase AC flows is branched at a branch point 16 into a first wire and a second wire. The first wire is connected to the motor 8a and the second wire is connected to the motor 8b. The current detectors 7a and 7b are provided between the inverter 6 and the branch point 16 in the configuration shown in FIG. 6. When an open phase occurs between the branch point 16 and the motors 8a and 8b, this configuration cannot detect in which phase the open phase occurs while occurrence of a malfunction can be detected.

Figure 7:
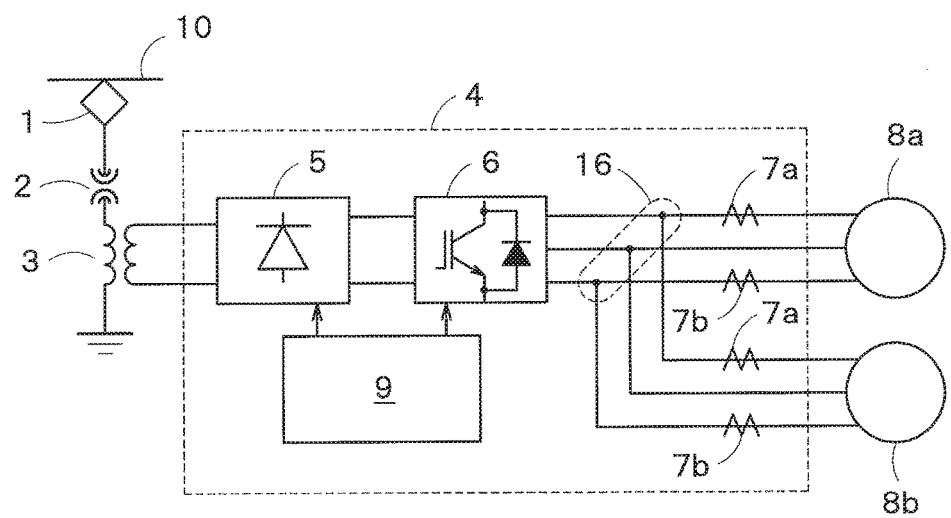
FIG. 7 shows a schematic configuration of a vehicle control device according to another modification of the present embodiment.

Therefore, in the case where the two motors 8a and 8b are provided, it is preferable to provide the current detectors 7a and 7b between the branch point 16 and each of the motors 8a and 8b as shown in FIG. 7. By providing the current detectors 7a and 7b to correspond to each of the motors 8a and 8b, it is possible to detect in which phase an open phase occurs.

While an example in which the current detectors 7a and 7b that detect the phase currents of two phases in the three-phase current flowing between the inverter 6 and the motor 8 are provided has been explained in the above embodiment, it is also possible to provide three current detectors to detect phase currents of three phases, respectively.

While an example in which the overhead line 10 is an AC overhead line (an AC power supply) has been explained in the above embodiment, the overhead line 10 can be a DC overhead line (a DC power supply). In such a case, it suffices to omit the transformer 3 and the converter 5 and to provide an LC filter including a reactor and a capacitor.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A vehicle control device comprising:
an inverter which converts a DC power to a three-phase AC power and supplies the three-phase AC power to a motor driving a vehicle;
a detector which detects a current value between the inverter and the motor; and
a controller which controls the inverter in a PWM manner based on a current value detected by the detector, a speed command signal, and a rotor frequency of the motor, wherein a PWM modulation rate of the controller is proportional to the rotor frequency during normal operation, and
wherein the controller determines whether a malfunction has occurred based on the PWM modulation rate and the rotor frequency, wherein the controller determines that a malfunction has occurred when the PWM modulation rate is equal to or higher than a first predetermined value and the rotor frequency is equal to or lower than a second predetermined value.

2. The device of claim 1, wherein the controller determines that the malfunction is an open phase, when the current value detected by the detector is lower than a third predetermined value.

3. The device of claim 1, wherein the motor to which the inverter supplies the three-phase AC power includes a first motor and a second motor.

4. The device of claim 3, wherein:
a wire connecting the inverter and the first and second motors is branched at a branch point into a first wire and a second wire, the first wire being connected to the first motor and the second wire being connected to the second motor, and
the detector includes a first detector provided in the first wire and a second detector provided in the second wire.

5. The device of claim 4, wherein:
the controller determines that the malfunction has occurred when a current value detected by the first detector, a current value detected by the second detector, or a sum of the current values detected by the first and second current detectors is smaller than a predetermined threshold.

6. A railroad vehicle comprising:
the vehicle control device of claim 3, and
the motor to which the three-phase AC power is supplied from the inverter.

7. A railroad vehicle comprising:
the vehicle control device of claim 1, and
the motor to which the three-phase AC power is supplied from the inverter.

* * * * *